United States Patent [19]
Protz, Jr.

[11] Patent Number: 5,624,094
[45] Date of Patent: Apr. 29, 1997

[54] SMALL ORNAMENT HANGER

[75] Inventor: William F. Protz, Jr., Lake Forest, Ill.

[73] Assignee: Santa's Best, Northfield, Ill.

[21] Appl. No.: 386,094

[22] Filed: Feb. 9, 1995

[51] Int. Cl.⁶ ............................................. F16B 45/00
[52] U.S. Cl. .................. 248/231.81; 24/375; 24/601.2;
    248/339; 248/215; 248/916; 248/306
[58] Field of Search ............................ 248/231.81, 304,
    248/305, 306, 339, 340, 214, 215, 916;
    24/601.2, 601.3, 375

[56] References Cited

U.S. PATENT DOCUMENTS

| | | | |
|---|---|---|---|
| 1,215,283 | 2/1917 | Kirkland | 24/375 X |
| 2,787,435 | 4/1957 | Shields | 248/340 X |
| 2,976,593 | 3/1961 | Exton | 24/601.2 X |
| 4,135,693 | 1/1979 | Miavitz | 248/304 X |
| 4,622,724 | 11/1986 | Dupre | 24/601.2 X |
| 4,691,416 | 9/1987 | Nakayama et al. | 24/601.2 X |
| 4,747,519 | 5/1988 | Green et al. | 248/339 X |
| 4,943,026 | 7/1990 | Fildan | 248/339 |
| 4,966,344 | 10/1990 | Gary | 248/214 X |
| 5,141,192 | 8/1992 | Adams | 248/231.81 |
| 5,383,638 | 1/1995 | Dieringer et al. | 248/231.81 X |
| 5,507,460 | 4/1996 | Schneider | 248/304 X |

*Primary Examiner*—Ramon O. Ramirez
*Assistant Examiner*—Brian J. Hamilla
*Attorney, Agent, or Firm*—Emrich & Dithmar

[57] ABSTRACT

An ornament hanger comprising an elongated loop shaped structure having an arcuate ornament supporting portion at one end and an attachment portion at the other end. A bendable closure member cooperates with the supporting portion to inhibit ornaments from disengaging from the ornament hanger. A part of the arcuate ornament supporting portion has an enlarged cross section with respect to other parts of the arcuate ornament supporting portion to provide strengthening of the supporting portion permitting heavy ornaments to be supported by the ornament hanger. The enlarged cross-sectional portion is dumbbell shaped. A part of the dumb bell shaped enlarged portion being asymmetrical such that one end of the enlarged portion in cross section is larger than the other end.

6 Claims, 1 Drawing Sheet

SMALL ORNAMENT HANGER

BACKGROUND OF THE INVENTION

This invention relates to an ornament hanger of the type used at Christmas time to hang small ornaments from trees, wires or other supports. There are a large variety of ornament hangers which are available but if the ornament hangers are made out of plastic they tend if not extremely bulky to be insufficiently strong for some of the heavier ornaments which are currently being used. The result of this unfortunate circumstance is that valued ornaments tend to deform the ornament hangers such that the ornament is released, falls and breaks.

The invention herein described obviates the problems of the prior art by using polyethylene or polypropylene which are common and relatively inexpensive synthetic organic resins while at the same time due to the unique construction and design, the inventive ornament hanger provides increased strength while still maintaining dimensions which are relatively slender and are attractive for use in home decorations.

SUMMARY OF THE INVENTION

Accordingly it is an object of the present invention to provide an ornament hanger which is attractive yet strong and lightweight.

Another object of the invention is to provide an ornament hanger of the type set forth which is small yet capable of carry ornaments heavier than the prior art ornament hanger available.

Still another object of the invention is to provide an ornament hanger of the type set forth in which the strength of the hanger is in part due to providing different shaped cross sections for different portions of the hanger.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 2:
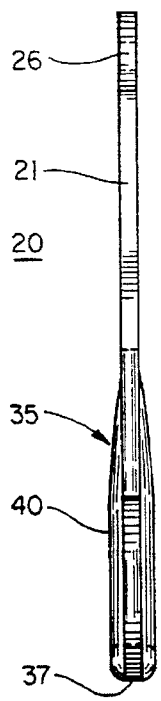
FIG. 2 is a left side elevational view of the ornament hanger illustrated in FIG. 1.
Figure 1:
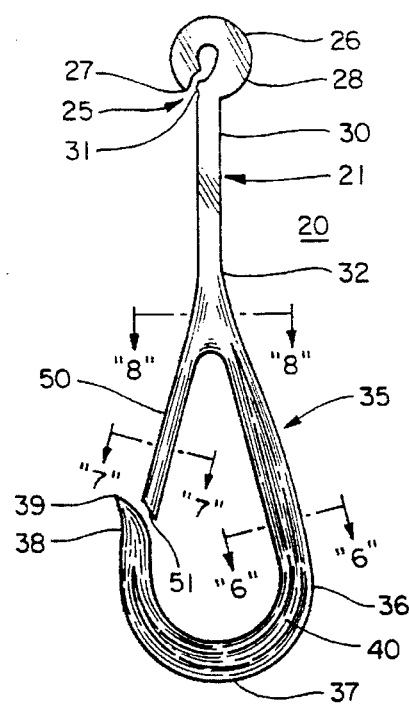
FIG. 1 is a front elevational view of the ornament hanger of the present invention.
Figure 3:
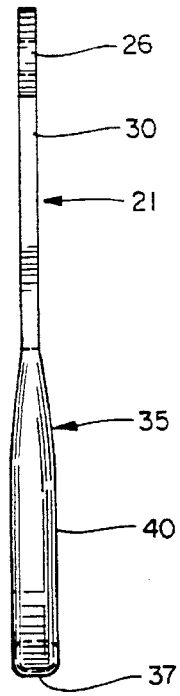
FIG. 3 is right side elevational view of the ornament hanger shown in FIG. 1.
Figure 4:
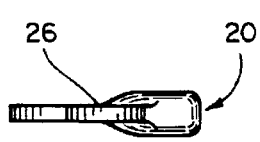
FIG. 4 is a bottom view of the ornament hanger shown in FIG. 1.
Figure 5:
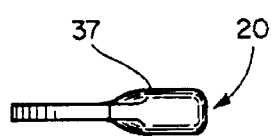
FIG. 5 is a top plan view of the ornament hanger shown in FIG. 1.

Referring to the drawings, there is disclosed therein an ornament hanger 20 of a one-piece construction 21 preferably polyethylene or polypropylene or mixtures thereof. The one-piece hanger 21 includes an attachment portion 25 and a support portion 35. The attachment portion 25 includes an ovate attachment member 26 which is generally curved and having a distal end 27. The ovate member 26 has a portion 28 opposite to the distal end 27 which is integral with and connects to a neck 30. A protrubence 31 extends into the space between the distal end 27 and the portion 28 of the attachment portion 25 joining the neck 30.

Figure 6:
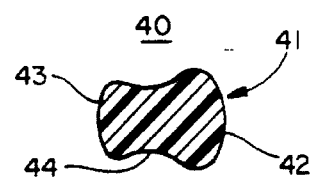
FIG. 6 a view in cross section of the ornament hanger illustrated in FIG. 1 as seen along lines 6—6 thereof.
Figure 8:
FIG. 8 is a cross sectional view of the ornament hanger illustrated in FIG. 1 as seen along lines 8—8 thereof.

The neck 30 leads to a throat portion 32 which has a larger width than the neck 30 and has a oval cross section illustrated in FIG. 8, the longer dimension of the oval extending in the direction of the greatest dimension of the throat 32. The throat 32 leads to and is integral with the support portion 35 which includes a hook shaped member 36 having a bottom arcuate portion 37 and a distal end 38 with an outwardly extending lip 39. A reinforcement portion 40 of member 36 extends from just below the throat 32 downwardly and around the bottom 37 and terminates just shy of the distal end 38. The reinforcement portion in transverse cross section is illustrated in FIG. 6 and has a dumb bell shape 41 with the larger end 42 facing outwardly forming the outer surface of the reinforcement portion 40 and the smaller inner end 43 forming the inner surface of the reinforcement portion 40. An area 44 of reduced dimension interconnects the outer larger portion 42 and the inner smaller portion 43.

A bendable closure member 50 extends downwardly from the throat 32 having a distal end 51 with a slanted terminal surface which is somewhat but not necessarily parallel to the lip 39 forming the support portion 35. A space between the distal end 51 and the lip 39 facilitates the ornaments hanger 20.

Figure 7:
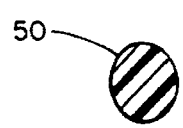
FIG. 7 is a viewing section of the ornament hanger illustrated in FIG. 1 as seen along lines 7—7 thereof.

An important aspect of the present invention is the reinforcement portion 40 with the dumb bell shape 41. This particular configuration enables the ornament hanger 20 to be made of a relatively inexpensive polyethylene or polypropylene or mixtures thereof while providing increased strength yet maintain a relatively small dimensioned ornament hanger. By use of the reinforcement portion 40 the ability to support heavier ornaments is enhanced without making the ornament hanger 20 bulky or unattractive. Another aspect of the invention is the oval transverse cross sections of the bendable closure member 50 and the throat 32, as is illustrated in FIGS. 7 and 8 respectively. The ovals are rotated 90° with respect to each other which may provide additional strength to the construction.

While there has been disclosed what is considered to be the preferred embodiment of the present invention, it is understood that various changes in the details may be made without departing from the spirit, or sacrificing any of the advantages of the present invention.

I claim:

1. An ornament hanger comprising:
    an elongated loop shaped structure having an arcuate portion at one end and another end in the form of a substantially closed loop with a slit opening having a protrubence extending thereinto;
    a bendable closure member for cooperation with said arcuate portion;

a part of said arcuate portion having an enlarged portion dumb bell shaped in transverse cross section to provide strengthening of said arcuate portion permitting heavy ornaments to be supported by said ornament hanger, at least a part of the enlarged portion dumb-bell shaped in transverse cross section being asymmetrical such that one end of the dumb-bell shape is larger than the other end of the dumb-bell shape.

2. The ornament hanger of claim 1, wherein said another end is joined to a neck portion terminating in said arcuate portion, said arcuate portion terminating in a free end, said bendable closure member joining said neck portion at one end and having a free end terminating near said free end of said arcuate portion.

3. The ornament hanger of claim 2, wherein said neck portion is oval in transverse cross section.

4. The ornament hanger of claim 3, wherein said free end of said bendable closure member is oval in transverse cross section.

5. The ornament hanger of claim 4, wherein a longer dimension of the cross section of said oval shaped neck portion and a longer dimension of the cross section of said oval shaped bendable closure members are rotated 90° with respect to each other.

6. The ornament hanger of claim 4, wherein said hanger is a synthetic organic resin selected from the group consisting of polyethylene, polypropylene and mixtures thereof.

* * * * *